United States Patent

Uehira et al.

Patent Number: 5,300,966
Date of Patent: Apr. 5, 1994

[54] PROJECTOR

[75] Inventors: Kazutake Uehira; Noboru Hagiwara; Kiyoshi Masuda, all of Tokorozawa; Tomoyoshi Nomura; Shigenobu Sakai, both of Tokyo, all of Japan

[73] Assignee: Nippon Telegraph and Telephone Corporation, Tokyo, Japan

[21] Appl. No.: 886,142

[22] Filed: May 21, 1992

[30] Foreign Application Priority Data

May 23, 1991 [JP] Japan ................... 3-117773

[51] Int. Cl.⁵ ............................. G03B 21/28
[52] U.S. Cl. ......................... 353/30; 353/37; 353/94; 353/99
[58] Field of Search ............ 353/30, 31, 33, 34, 353/37, 94, 98, 99, 81; 359/40, 48, 36

[56] References Cited

U.S. PATENT DOCUMENTS

| | | | |
|---|---|---|---|
| 3,055,265 | 9/1962 | Smith . | |
| 3,450,461 | 6/1969 | Takayanagi . | |
| 4,552,441 | 11/1985 | Dewey | 353/31 |
| 4,864,390 | 9/1989 | McKechnie et al. | 353/34 |
| 4,916,485 | 4/1990 | Loth et al. | 352/198 |
| 5,042,921 | 8/1991 | Sato et al. | 359/40 |
| 5,046,837 | 9/1991 | Stroomer et al. | 353/34 |
| 5,097,323 | 3/1992 | Sato et al. | 353/34 |
| 5,153,621 | 10/1992 | Vogeley | 353/37 |

FOREIGN PATENT DOCUMENTS 58-62625 4/1983 Japan .

OTHER PUBLICATIONS

"Interframe Multiplexed Video Projection Display," IBM Technical Disclosure Bulletin, vol. 33, No. 2, Jul. 1990, New York US, p. 63.
Patent Abstract of Japan, vol. 012, No. 044 (E-581), Feb. 9, 1988; Japanese Publication No. 62-194788 dated Aug. 27, 1987.
Patent Abstract of Japan, vol. 013, No. 144 (E-740), Apr. 10, 1989; Japanese Publication No. 63-306792 dated Dec. 14, 1988.
Communication from European Patent Office and European Search Report.

Primary Examiner—William A. Cuchlinski, Jr.
Assistant Examiner—William C. Dowling
Attorney, Agent, or Firm—Finnegan, Henderson, Farabow, Garrett & Dunner

[57] ABSTRACT

An original image is divided into a plurality of image parts in the forms of image signals which are then given to liquid crystal light valves, respectively so that liquid crystal light valves display the plurality of image parts therein. These liquid crystal light valves allow light from light sources to pass through so as to form image light beams which are intensity-modulated in accordance with the divided image parts. A plurality of mirrors reflect the image light beams and introduce them onto a projecting lens system. In this arrangement, the plurality of mirrors are located in such a way that their reflecting surfaces do not cross the optical axis of the projecting lens system, and the image light beams are synthesized on the screen so as to reproduce an original image. Accordingly, the pixel density of the original image can be multiplied by a multiplier which equal to the number of used liquid crystal light valves.

20 Claims, 12 Drawing Sheets

PROJECTOR

FIELD OF THE INVENTION

The present invention relates to a technology with which a large size image plane is projected onto a screen, and in particular to a projector for displaying an image plane with a high definition.

BACKGROUND OF THE INVENTION

In recent years, with increased diversification of the image application field, several kinds of displays technology of a large size image plane have been developed.

FIG. 14 is a sectional view illustrating one example of the arrangement of a projector in this kind of technology. Referring to this figure, a liquid crystal light valve 2 in which several pixels are two-dimensionally arrayed is shown. An image signal is inputted to this liquid crystal light valve 2, as is similar to the well-known liquid crystal televisions, and accordingly, the pixels are driven so as to form an image. In this arrangement, the pixels are constituted by, for example, a well-known active-matrix system. A light source 5 for emitting white light to the liquid crystal light valve 2 is located in the rear of the latter. A projection lens 3 focuses light which has passed through the liquid crystal light valve 2 onto a screen 6 for forming an image (this light will hereafter be denoted as "image light").

With the above-mentioned arrangement, when an image signal is supplied to the liquid crystal light valve 2, the pixels are driven in accordance with the image signal so as to form an image in the liquid crystal light valve 2. Further, light passes through this liquid crystal light valve 2 so as to create an intensity-modulated image light. This image light is focused onto the screen 6 by the projection lens 3. As a result, the image formed in the liquid crystal light valve 2 is magnified and projected onto the screen 6, thereby making it possible to display a large size image plane.

The image projected by the projector has a resolution which is determined by the number of pixels that constitute the liquid crystal light valve 2. At present, the number of pixels in the liquid crystal light valve 2 is substantially equal to that of the well-known liquid crystal televisions. Accordingly, the number of pixels per unit area is large in a liquid crystal television having a small size screen, and therefore, it is considered that the liquid crystal light valve 2 can provide an image with a relatively high definition. However, when this image is magnified and projected for displaying a large size image plane, the number of pixels per unit area decreases, and accordingly, the pixel density is lowered, resulting in an image having a low resolution.

Accordingly, at present, the objective is to increase the pixel density or the size of a liquid crystal panel itself. Thus, a liquid crystal light valve 2 displaying on a high definition television (HDTV) have been being developed. However, in the case where increasing the density of pixels in the liquid crystal light valve 2, the production yield is greatly reduced in the present manufacturing process, resulting in a high manufacturing cost. Further, there is a technical limitation in that the length of one side of one pixel cannot be less than the thickness of a liquid crystal panel even though the size of one pixel is reduced in order to increase the pixel density. Further, in the case where increasing the size of the liquid crystal panel itself so as to increase the number of pixels, the production yield decreases, similar to the situation resulting when of increasing the pixel density is increased, causing a high cost. That is, an increase, exceeding the present available number, in the number of pixels in the liquid crystal light valve 2 is very difficult to achieve, and accordingly, it has been difficult to increase the definition of a magnified image.

Accordingly, in order to avoid incurring the above-mentioned problems caused by an increase in the number or the density of pixels in the liquid crystal light valve 2, a projector which can effectively increase the definition of the projected image has been proposed, without increasing the number of pixels in the liquid crystal light valve 2. FIG. 15 is a schematic view illustrating one example of this arrangement. In this figure, like reference numerals are attached to like parts to those shown in FIG. 14, and an explanation thereto is omitted.

In the projector shown in this figure, a prism mirror PM having two reflecting surfaces is located in the rear of the projecting lens 3. This prism mirror PM bisplits the optical axis m so as to form two image planes. Further, two liquid crystal light valves 21, 22 and two light sources 51, 52 for emitting light to the former are arranged corresponding to these two image planes. With this arrangement, images displayed on these two liquid crystal light valves 21, 22 are projected by means of the lens 3 onto the right and left halves of the screen 6, respectively, so that a continuous projected image can be obtained on the screen 6. That is, as shown in FIG. 15, the image given by the liquid crystal light valve 22 is displayed over the area indicated by A on the screen 6 while the image given by the liquid crystal light valve 21 is displayed over the area indicated by B on the screen. Accordingly, an image signal to be fed to these two liquid crystal light valves 21, 22 is divided into two for the respective areas, and are then inputted to the liquid crystal light valves 21, 22 so as to display the original image on the screen. In this arrangement, in which the display images in the two liquid crystal light valves are synthesized so as to display the original image, it is possible to obtain a pixel density which is two times as great as that conventionally obtained.

However, with this type of projector, the following disadvantages have been inevitably arisen. That is, if the characteristics of the liquid crystal light valves 21, 22 for forming left and right projected images are different, a joint seam becomes visible on the screen, being caused by a difference between the characteristics thereof, and accordingly, the quality of the projected image deteriorates. Further, in the above-mentioned projector, since the effective display areas of the liquid crystal light valves are increased, the size of the projection lens has to be increased.

SUMMARY OF THE INVENTION

Accordingly, one object of the present invention is to provide a projector for forming a magnified and projected image with a high definition in a seamless manner, without increasing the pixel density in the liquid crystal light valve 2 or increasing the size of a liquid crystal panel.

According to the present invention, there is provided a projector having an image display means for displaying an image in accordance with an image signal, a light source for emitting light to the image forming means, and a projecting lens system for projecting image light which has passed through the image forming means so as to be intensity-modulated in accordance with said image, characterized by a plurality of display means to which image signals exhibiting a plurality of image parts obtained by dividing an original image are fed, and a plurality of mirrors arranged corresponding to said plurality of image display means, for reflecting image light beams which have passed through the image display means so as to be intensity-modulated in accordance with said divided image parts, so as to introduce the image light beams to the projecting lens system, wherein said plurality of mirrors are arranged at positions where their reflecting surfaces do not cross the optical axis of the lens system except at its side or apex, so as to superpose and synthesize the divided image parts on the screen in order to reproduce the original image.

With the above-mentioned arrangement, the divided image parts displayed by the plurality of display means are superposed on the same area of the screen, in comparison to the pixel densities achieved in the past, reproduction of an original image. Thus, it is possible to multiply the pixel density by a multiplier which is equal to the number of the display means used. Accordingly, the pixel density of an image projected and displayed on the screen can be substantially increased without increasing the pixel density and the size or area of each of the used display means. Further, according to the present invention, only one projecting lens is used, and accordingly, the problem of image distortion caused by the lens can be eliminated, thereby it is possible to facilitate the alignment of a plurality of divided image parts which are synthesized.

DESCRIPTION OF PREFERRED EMBODIMENTS

Embodiments of the present invention will be hereinbelow detailed with reference to the drawings.

First Embodiment

Figure 1:
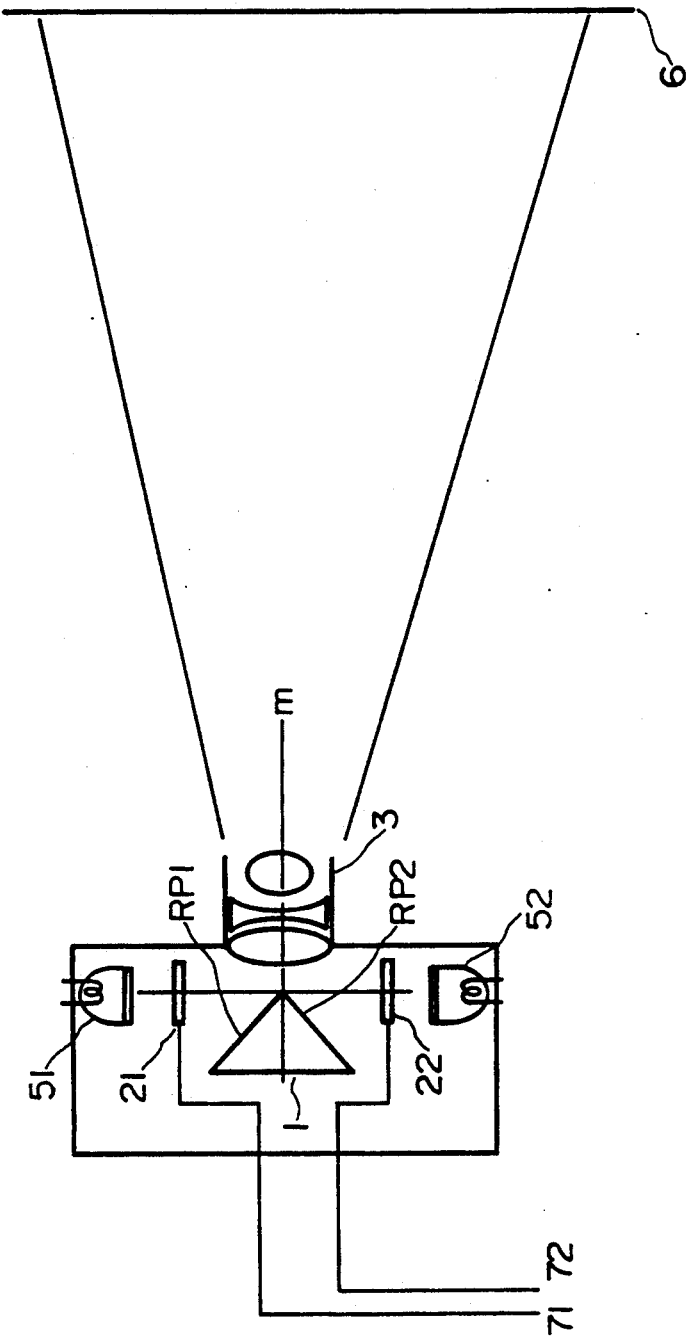
FIG. 1 is a sectional view illustrating an arrangement of a first embodiment of the present invention.

Referring to FIG. 1 which is a sectional view illustrating the arrangement of a projector in one embodiment form of the present invention. An integrally formed mirror 1 is composed of a right-angled triangular pole having two surfaces PR1, PR2 which serves as reflecting surfaces. Liquid crystal light valves 21, 22 incorporate pixels in a number similar to that conventionally used, and light sources 51, 52 emit light to the rear surfaces of these two liquid crystal light valves 21, 22, respectively. Image signals are fed to liquid crystal light valves 21, 22 through image signal lines 71, 72, a projection lens 3 has an optical axis m.

As shown in this figure, the mirror 1 is arranged so that the right angled part of the right angled triangular pole is bisectioned by the optical axis m. That is, in this arrangement, the angles of the reflecting surfaces RP1, RP2 with respect to the optical axis m are set to 45 degrees. However, it is noted that the angles of the reflecting surfaces RP1, RP2 can be set to an arbitrary value, that is, it is sufficient to locate the mirror 1 in such a way that the apex between the reflecting surfaces PR1, PR2 can be bisectioned. Incidentally, as shown in FIG. 1. A lens for enhancing the paralleliation of light emitted from the light sources and, which was, according to the prior art, located between the light sources and the liquid crystal light valves is eliminated.

The liquid crystal light valves 21, 22 are arranged so as to satisfy the following conditions. First, with the arrangement shown in FIG. 1, estimation is made such that a light beam extends from the screen 6 along the optical axis m of the projecting lens 3. This light beam passes through the projecting lens 3 and is bidivided in the vicinity of the apex of the mirror 1 into two sub-beams which then advance respectively in directions orthogonal to the optical axis m. Further, the liquid crystal light valves 21, 22 are arranged so that these two sub-beams pass through the centers of the display surfaces thereof, respectively. The liquid crystal light valves 21, 22 are arranged in accordance with the above-mentioned condition, and accordingly, the centers of the display surfaces of the liquid crystal light valves 21, 22 can be aligned with the optical axis m.

By the way, the reflecting surfaces RP1, RP2 for reflecting the light which has passed through the liquid crystal light valves 21, 22, that is, the intensity-modulated image light, are located in the upper and lower half sections above and below the optical axis m. However, with the arrangement shown in FIG. 1, the images displayed by the liquid crystal light valves 21, 22 can be projected on the screen 6 in its entirety even with this positional relationship. Explanation of the principle thereof will be made below with reference to FIG. 2.

Figure 2:
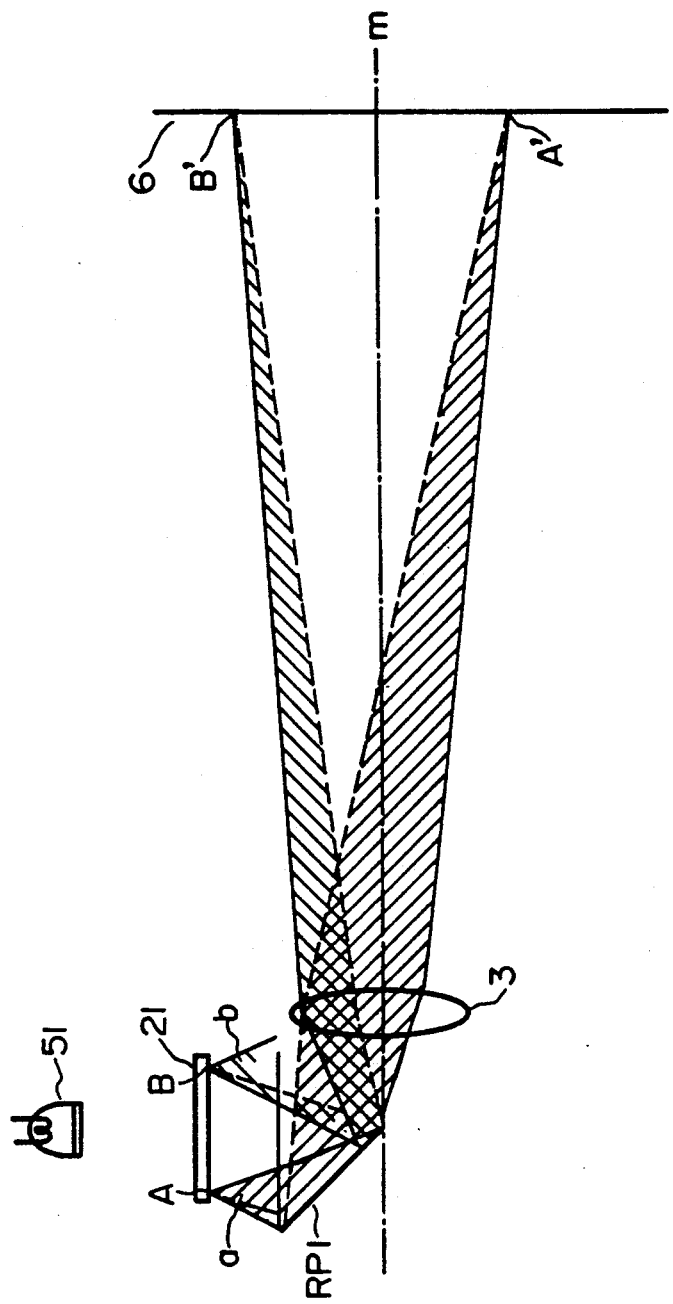
FIG. 2 is a plan view for explaining the principle of image display in the embodiment shown in FIG. 1.

FIG. 2 is a plan view showing the relationship among the reflecting surface RP1 located in the upper half section above the optical axis m, the liquid crystal light valve 21 and the light source 51. In this figure, reference numerals A, B denote pixels which are positioned as both ends of the liquid crystal light valve, and A', B' denote positions which corresponds to the pixels A, B and at which they are projected and displayed on the screen 6. Further, a, b denote image light beams emitted from the pixels A, B.

These image light beams a, b diverge in their direction of advance, as shown by oblique-lined sections. That is, the image light beam a emitted from the pixel a is reflected by the reflecting surface RP1, and thereafter, is focused at A' on the screen 6 by the projection lens 3. Meanwhile the image light beam b is reflected in part by the reflecting surface RP1, and focused at the position B' on the screen 6 by way of the projection lens 3. Thus, the reflecting surface RP1 projects all of the image light from the liquid crystal light valve 12 onto the screen 6 even though it is positioned in the upper half section above the optical axis m.

However, in this arrangement, the image projected on the screen 6 dose not have a uniform brightness, that is, a bright and dark distribution is caused. As clearly understood from FIG. 2, this is because the image light beam a emitted from the pixel A is projected on the screen 6 in its entirety, but only a part of the image light beam b emitted from the pixel B is projected onto the screen. In order to compensate this bright and dark distribution so as to make uniform the brightness of the image projected onto the screen 6, the values of image signals applied to the respective pixels are compensated by, for example, a look-up table system. That is, for a pixel which gives a dark image on the screen 6, its image signal value is multiplied by a large correction coefficient while for the pixel which gives a bright image, the image signal value is multiplied by a small correction coefficient.

Next, an explanation will be made below of the image formed by the liquid crystal light valves 21, 22 with reference to FIG. 3. In this figure, an original image ORG is composed of pixels $P_{11}$ to $P_{mn}$ which are arrayed in m rows and n columns. Estimation is made such that the original image ORG is highly definitive so that the number of pixels exceeds that of pixels which constitute the liquid crystal light valve. Accordingly, the original image ORG cannot be displayed by only one liquid crystal light valve. Thus, this original image ORG is synthesized by both liquid crystal light valves 21, 22 on the basis of the above-mentioned principle.

Figure 3:
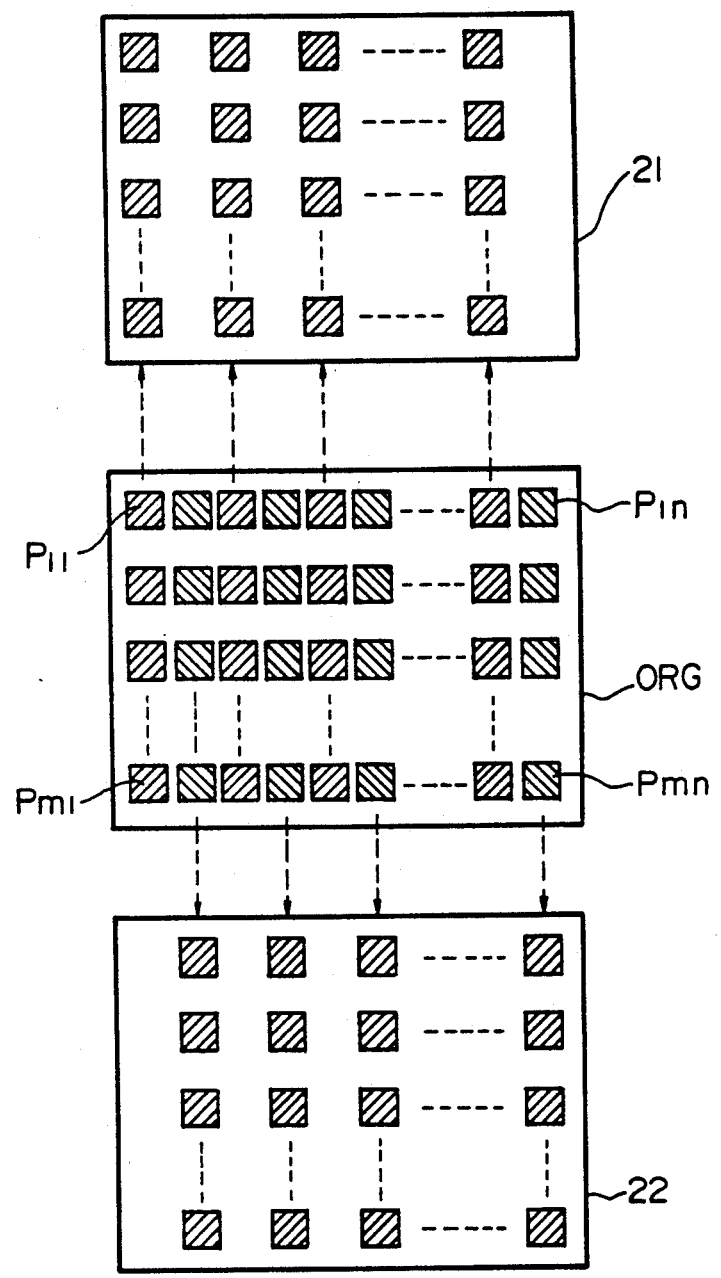
FIG. 3 is a view for explaining a method of dividing an original image ORG into two image parts and allocating the divided image parts, respectively, to liquid crystal light valves 21, 22.

That is, as shown in FIG. 3, rows of pixels laid horizontally in the original image ORG are divided into two groups consisting of odd number lines and even number lines, and, for example, the pixels in the group consisting of the odd number lines are allocated to the liquid crystal light valve 21 while the pixels in the group consisting of the even number lines are allocated to the liquid crystal light valve 22. Further, the pixels which are divided into two groups are projected onto the screen over one and the same area thereon so as to synthesize the original image ORG. Accordingly, it is possible to project and display the original image ORG which is effectively highly definitive, on the screen without increasing the number of pixels in each liquid crystal light valve.

Figure 4:
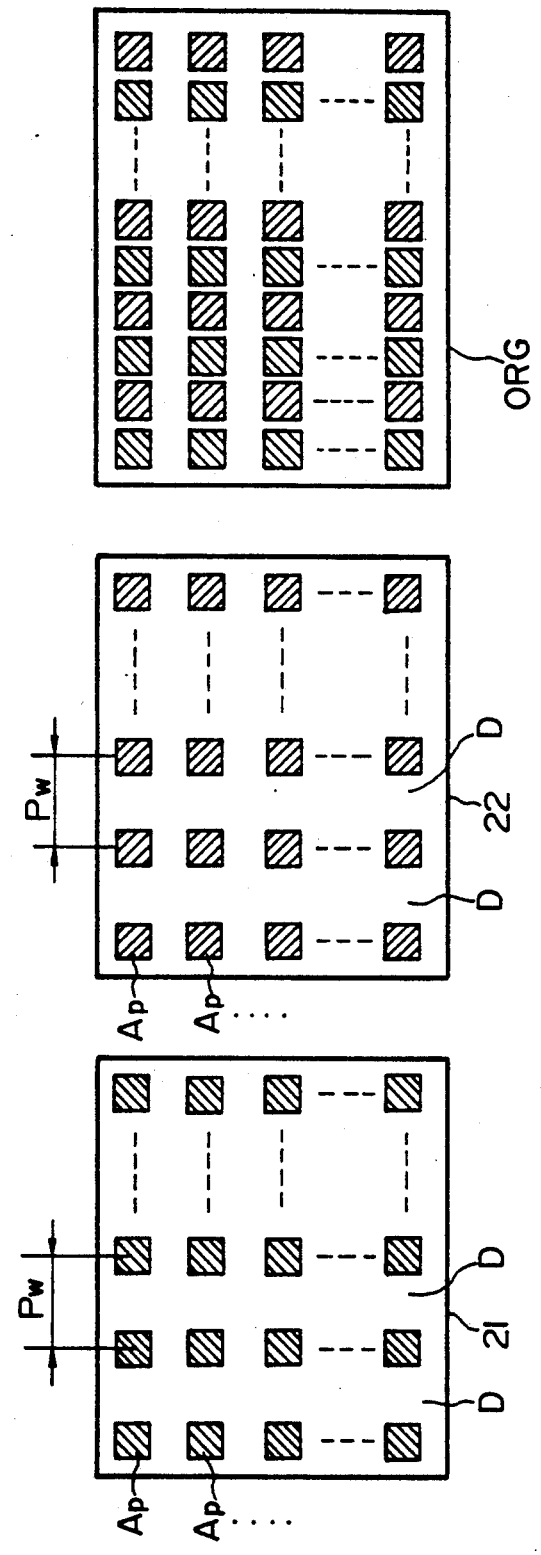
FIG. 4 is a view illustrating the location of pixels in the liquid crystal light valves 21, 22 in the embodiment, and the synthesized condition of the pixels in these liquid crystal light valves 21, 22.

An Explanation will be made below of the principle of projection and display with reference to FIG. 4. The liquid crystal light valves 21, 22 are composed of several pixels which are arrayed two-dimensionally. Further, each of the pixels is composed of an opening (aperture) for allowing light to pass through, metal wirings which are so-called image signal lines or gate lines, a switching thin-film translator and the like. With the thus constructed pixel, only the opening Ap can contribute to the projection and display. An ineffective area D, which does not contribute to the projection and display, is provided with the above-mentioned metal wirings or the thin-film transistor. Accordingly, several openings Ap are arrayed at pixels pitches Pw, being spaced by the ineffective areas D.

Accordingly, as mentioned above, the pixel lines which are laid horizontally in the original image ORG are divided into the groups consisting of odd number lines and even number lines, and, for example, the pixels in the group consisting of the odd number liens are allocated to the liquid crystal light valve 21 while the pixels in the group consisting of even number lines are allocated to the liquid crystal light valve 22. Further, in order that the thus bidivided pixel lines are synthesized, the image formed by the liquid crystal light valve 22 is shifted by a half of the value of the pitches Pw, with respect to the image formed by the liquid crystal light valve 21, and then both images are projected and displayed. That is, as shown in FIG. 4, the openings Ap in the pixels are arranged so as to cancel out the ineffective areas D in both liquid crystal light valves 21, 22, and accordingly, a high density pixel array can be obtained, thereby it is possible to reproduce a highly definitive original image ORG. As mentioned above, since the two images are synthesized to cancel out the ineffective areas D, it is possible to obtain a pixel density which is two times as high as that which is achieved by conventional methods.

Second Embodiment

Figure 5:
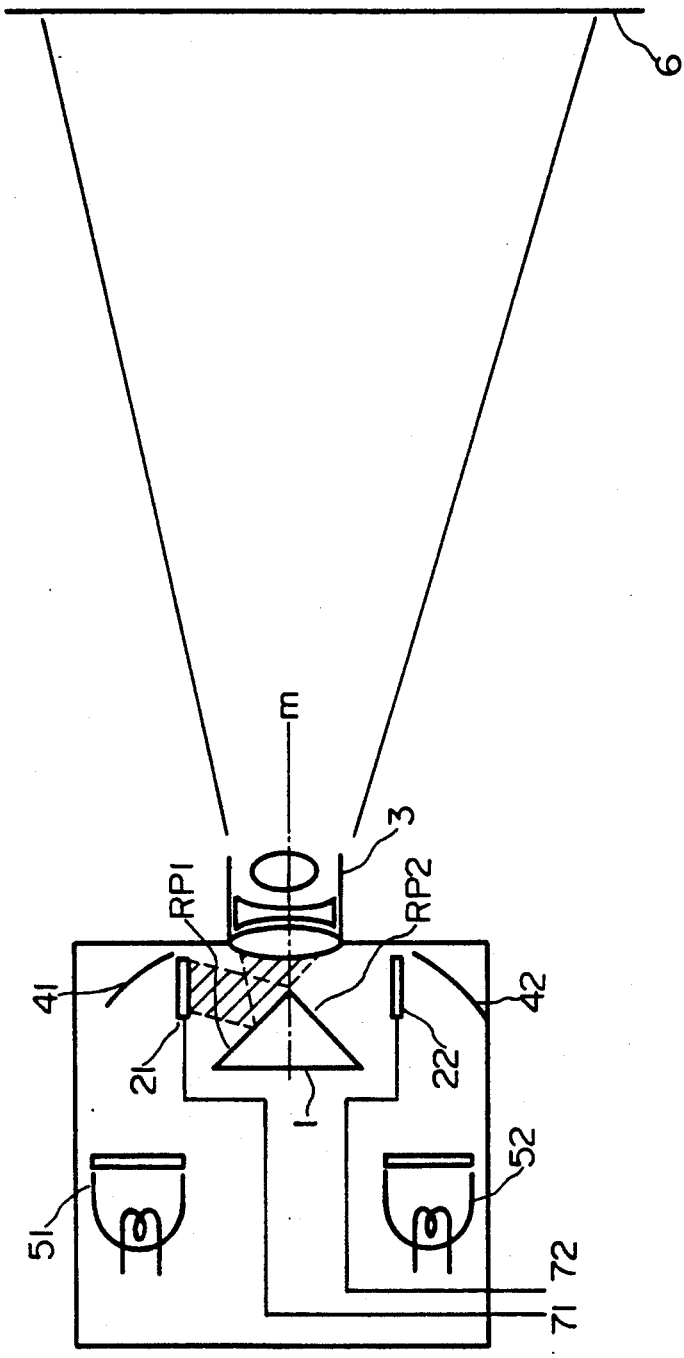
FIG. 5 is a sectional view illustrating the arrangement of a second embodiment of the present invention.

FIG. 5 is a sectional view illustrating the arrangement of a second embodiment of the present invention. The second embodiment differs from the first embodiment in view of the following points: that is, concave mirrors 41, 42 each having a concave-curved surface are disposed between the light sources 51, 52 and the liquid crystal light valves 21, 22, respectively. The concave mirrors 41, 42 have their optical axes which are aligned with the centers of the liquid crystal light valves 21, 22. These concave mirrors 41, 42 converge light from the light sources 51, 52 and uniformly introduce the same to the liquid crystal light valves 21, 22. Accordingly, the light-converging rate of the light incident upon the liquid crystal light valves 21, 22 can be enhanced.

With this arrangement, since uniform light is incident upon the liquid crystal light valves 21, 22, no bright and dark distribution occurs, contrary to the first embodiment as mentioned above. Thus, in this embodiment, it is not necessary to correct the image signal value fed to each pixel by the look-up table system. Further, in this embodiment, the image brightness of the image projected and displayed on the screen 6 is increased as the light converging rate increases.

It is noted that instead of the concave mirrors 41, 42, a convex lens may be arranged similarly. It goes without saying that similar effects to those obtained by the concave mirrors can be obtained.

Third Embodiment

Figure 6:
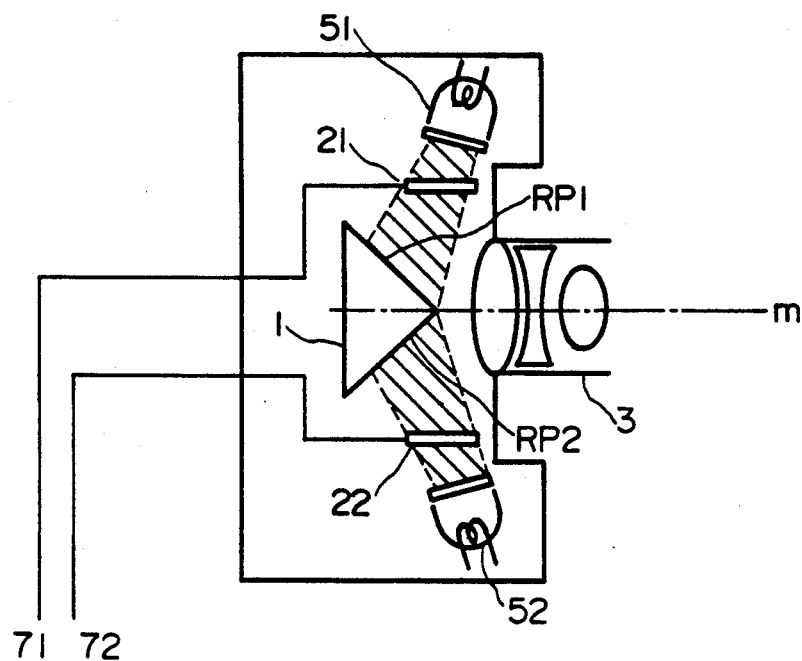
FIG. 6 is a sectional view illustrating the arrangement of a third embodiment of the present invention.

FIG. 6 is a sectional view illustrating the arrangement of a third embodiment of the present invention. The feature of this embodiment is the provision of an arrangement such that the light sources are located obliquely in the rear of the liquid crystal light valves 21, 22, respectively. With this arrangement, the light emitted from the light sources 51, 52 are incident upon the liquid crystal light valves 21, 22 over the entire surface thereof, and accordingly, the efficiency of the use of the light can be enhanced so that the brightness of a projected and displayed image can be increased. Also in this case, no bright and dark distribution occurs, contrary to the first embodiment as mentioned above, and accordingly, no compensation to the image signal is required. It is noted that with the exception of [the above-mentioned positional arrangement of the light sources 51, 52 which are located obliquely in the rear of the liquid crystal light valves 21, 22] the arrangement and the display principle of the apparatus in this embodiment are identical with those of the first embodiment, the above-mentioned positional arrangement of the light sources 51, 52 which are located obliquely in the rear of the liquid crystal light valves 21, 22.

Fourth Embodiment

Figure 7:
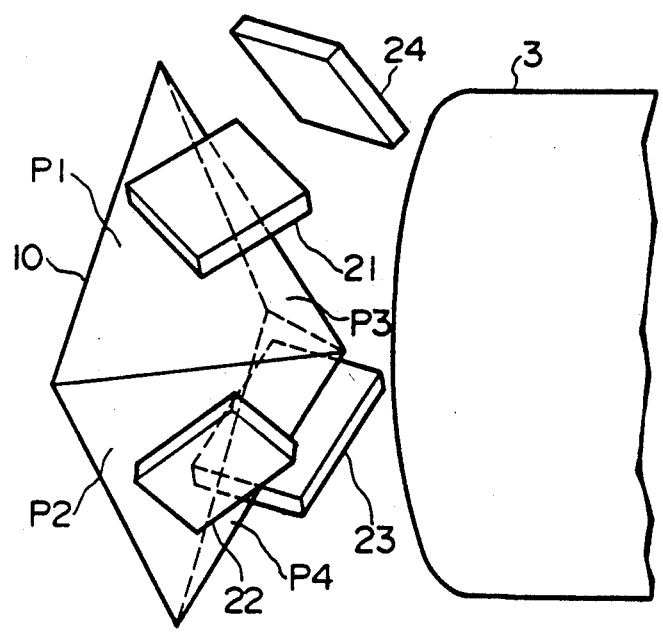
FIG. 7 is a perspective view illustrating the arrangement of a fourth embodiment of the present invention.
Figure 8:
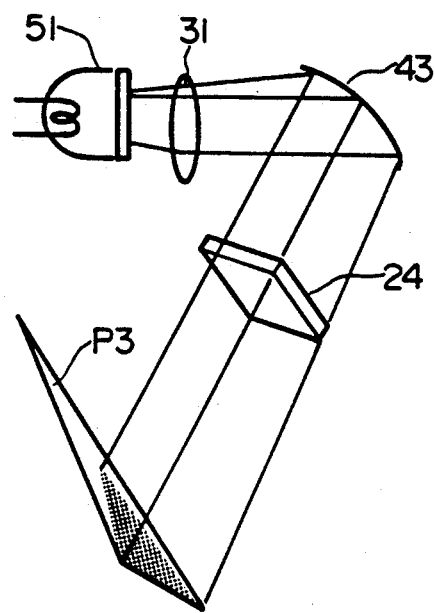
FIG. 8 is a perspective view for explaining the relationship between reflecting surfaces P1 to P4 and liquid crystal light valves 21 to 24.

FIG. 7 is a schematic perspective view illustrating the arrangement of a fourth embodiment of the present invention. In this figure, the light guide system from the light sources to the liquid crystal light valves is omitted from the explanation for the sake of brevity in. Referring to FIG. 7, a pyramidal mirror 10 is integrally incorporated with four inclined reflecting surfaces P1 to P4. This pyramidal mirror 10 is located with its apex being set on the optical axis of the projection lens 3. The angles of the four reflecting surfaces P1 to P4 can be set arbitrarily, but are set to 45 degrees in this embodiment. Further, liquid crystal light valves 21 to 24 are arranged facing respectively the reflecting surfaces P1 to P4. Explanation will be made of the relationship between the reflecting surfaces P1 to P4 and the liquid crystal light valves 21 to 24 with reference to FIG. 8. It is noted that FIG. 8 shows only the relationship between the reflecting surface P3 and the liquid crystal light valve 24 in order to simplify the explanation. Referring to FIG. 8, the light emitted from the light source 51 is converged by the concave mirror 43, and thereafter is introduced uniformly to the liquid crystal light valve 24.

Figure 9:
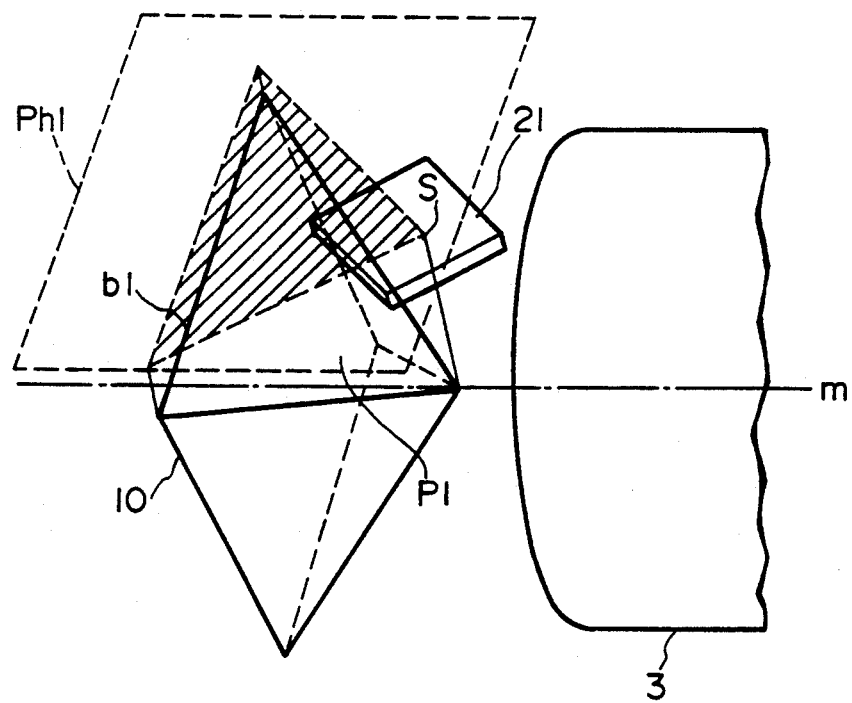
FIG. 9 is a perspective view for explaining the positional relationship between the liquid crystal light valves 21 to 24 in the fourth embodiment.

Then, explanation will be made of the positional relationship of the liquid crystal light valves 21 to 24. For the sake of brevity in explanation, FIG. 9 shows only the positional relationship of the liquid crystal light valve 21

It is noted that the positional relationships of the other liquid crystal light valves 22 to 24 are the same as that of the liquid crystal light valve 21.

The positional condition of the liquid crystal light valve 21 is as follows. That is, (1) the plane in which the liquid crystal light valve 21 is laid on the one including the bottom side b1 of the associated reflecting surface P1, that is, the plane Ph1 which is parallel to the optical axis m of the projection lens 3; (2) the center of the display surface of the liquid crystal light valve 21 is coincident with the apex S of an isosceles triangle (given by oblique lines in the figure) which is obtained by projecting the reflecting surface P1 onto this plane Ph1; and (3) The sides of the liquid crystal light valve 21 are arranged, parallel with or orthogonal to the two equal sides of the isosceles triangle (the part given by oblique lines in the figure). Although the above-mentioned conditions are not always absolute, the center of a projected and displayed image can be set on the optical axis m of the projecting lens 3 by satisfying these three conditions (1) to (3). Further, these arrangement conditions are those by which the light having passed through the liquid crystal light valve 21 can be reflected by the reflecting surface P1 with the highest efficiency.

Next, an explanation follows of a method of forming images on the liquid crystal light valves 21 to 24 which are arranged in the conditions as mentioned above. In this case, similar to the first embodiment as mentioned above, the pixel lines laid horizontally in an original image are divided into two groups consisting of odd number lines and even number lines, and an image OI obtained by the group consisting of odd number liens and an image EI obtained by the group consisting of even number lines are separated from each other. Then, pixel lines which are laid vertically in the image OI are divided into two groups consisting of odd number lines and even number lines, and an image OIO obtained by the group consisting of odd number lines and an image OIE obtained by the group consisting of even number lines are separated from each other. The image EI is similarly divided into an image EIO given by a group consisting of odd number lines, and an image EIE given by a group consisting of even number lines. As a result, the original image is divided into four separate images, that is, the images OIO, OIE, EIO, EIE.

These four images OIO, OIE, EIO, EIE are projected and displayed, corresponding to the liquid crystal light valves 21 to 24. In the projection and display, the four images OIO, OIE, EIO, EIE are projected on the screen over one and the same area with the principle as mentioned above while these images are shifted by a half of the value of pixel pitches PW from each other, respectively, in the horizontal and vertical direction. With the projection and display in this manner, the pixel density is two times as high as that of the conventional arrangement in which a single liquid crystal light valve is used, in both horizontal and vertical directions.

Figure 10:
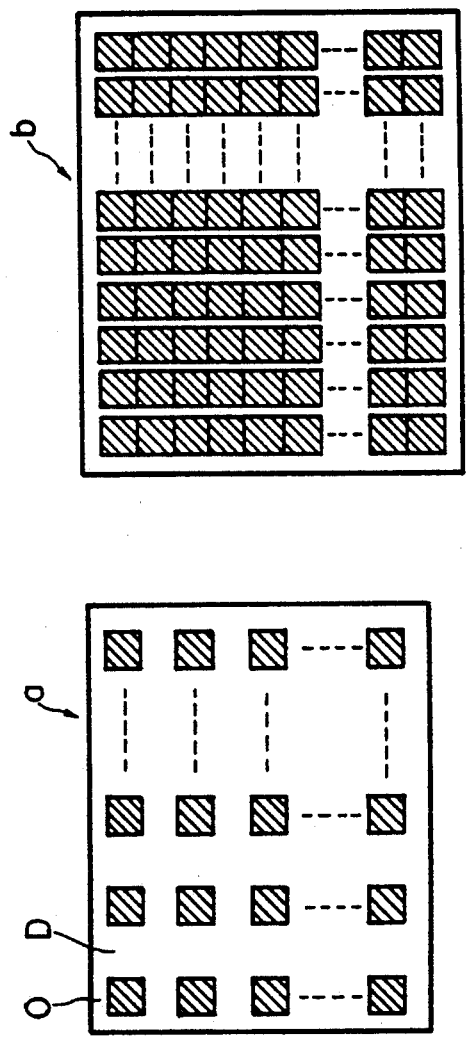
FIG. 10 is a view illustrating a pixel array to be displayed on a screen in the fourth embodiment.

FIG. 10 is a view illustrating a pixel array which is synthesized by the above-mentioned four image projection. In this figure, reference numeral a denotes a pixel array in the liquid crystal light valve in which one of the above-mentioned four images is formed, and b denotes a pixel array in a condition such that the image arrays a are shifted by a half of the value of the pixel pitches Pw with respect to each other in both horizontal and vertical directions so as to synthesize the four images. As clearly understood from this figure, since the pixel density is two times as high as that obtained by the conventional projection and display, in both horizontal and vertical directions, it is possible to obtain a highly definitive projected and display image having a pixel density which is four times as high as that of one obtained through conventional methods.

Fifth Embodiment

Figure 11:
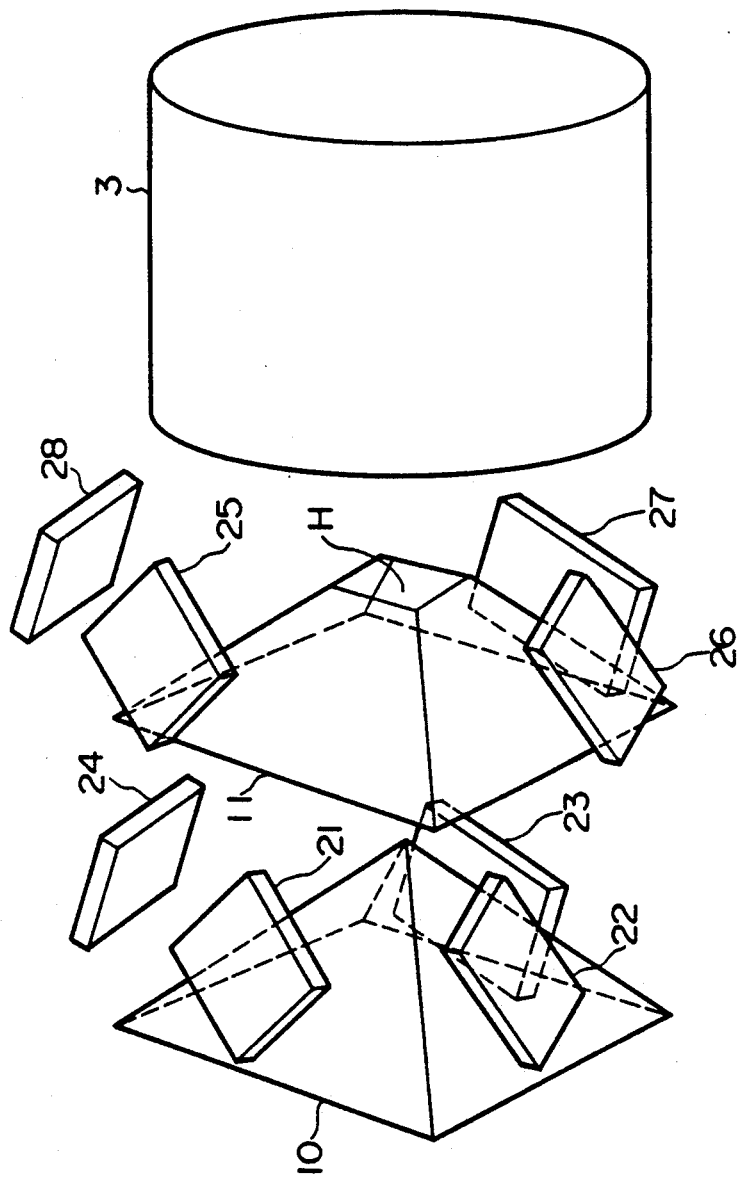
FIG. 11 is a perspective view illustrating the arrangement of a fifth embodiment of the present invention.

Next, FIG. 11 is a perspective view illustrating the arrangement of a fifth embodiment of the present invention. This fifth embodiment shown in this figure differs from the fourth embodiment shown in FIG. 7, in view of the following points: a truncated pyramidal mirror 11 having four reflecting surfaces is disposed between the pyramidal mirror 10 and the projection lens 3, and liquid crystal light valves 24 to 28 are arranged corresponding to the reflecting surfaces of the mirror 11. The mirror 11 has a hollow inside, and the top angled part of the rectangular pyramid is cut out so as to form a truncated pyramidal pyramid shape having an opening H. This mirror 11 is located in close vicinity to the projection lens 3. Accordingly, the light beams having passed through the liquid crystal light valves 25 to 28 are reflected by the associated reflecting surfaces of the mirror 11 and are thereafter introduced to the projection lens 3. Meanwhile, the light beams having passed through the liquid crystal light valves 21 to 24 are reflected by the associated reflecting surfaces of the mirror 10 and are thereafter introduced to the projection lens 3 through the opening H of the mirror 11. Accordingly, if both mirrors 10, 11 are arranged on the optical axis of the projecting lens 3, the images of the liquid crystal light valves 21 to 28 are projected and displayed on the screen.

In the case for the projection and display of the images of the liquid crystal light valves 21 to 28, the pixels formed in the liquid crystal light valves 21 to 24 are shifted from each other by one-fourth of the value of the pixel pitches Pw in the horizontal direction. Further, the pixels formed in the liquid crystal light valves 25 to 28 are shifted from each other by one-fourth of the value of the pixel pitches Pw in the horizontal direction, but by one-half of the value of the pixel pitches Pw in the vertical direction. Then, the images are projected and displayed on the screen. With the projection and display as mentioned above, the pixel density is four times as high in the horizontal direction, as that which is conventionally achieved and is two time as high in the vertical direction, as that which is conventionally achieved. Therefore, overall, a pixel density eight times as high as that which is conventionally achieved can be obtained. It is noted that the process of dividing the original image into eight portions is similar to that explained in the fourth embodiment, and accordingly, the explanation thereto is omitted.

Sixth Embodiment

Figure 12:
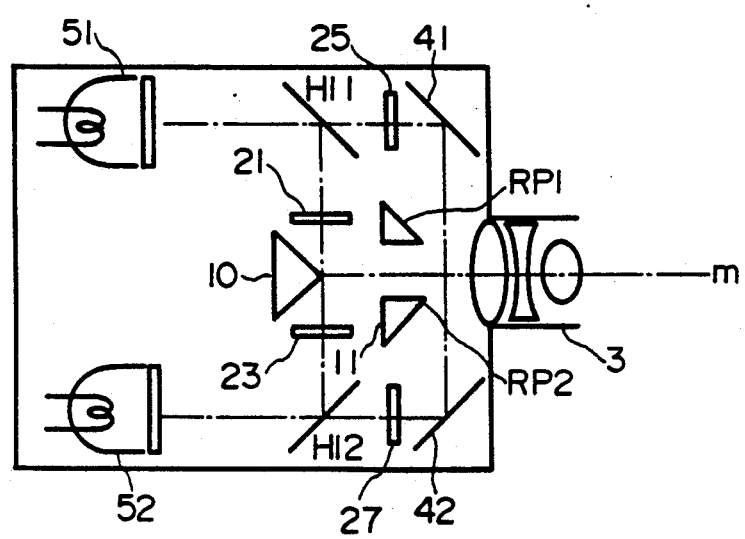
FIG. 12 is a sectional view illustrating the arrangement of a sixth embodiment of the present invention.

Next, FIG. 12 is a sectional view illustrating the arrangement of a sixth embodiment of the present invention. The sixth embodiment shown in this figure differs from the fifth embodiment in that half mirrors $H_{11}$, $H_{12}$, $H_{21}$, $H_{22}$, and total reflection mirrors 41 to 44 are provided in order to reduce the number of light sources to a half, that is, from 8 to 4. It is noted that the light sources 55, 54, the half mirrors $H_{12}$, $H_{22}$, and the total reflection mirrors 43, 44 are not shown in this figure since the section of the apparatus is shown.

That is, in this embodiment, light emitted from one of the light sources, for example, the light source 51 is divided into two light beams by the half mirror $H_{11}$, one of them being introduced into the liquid crystal light valve 21, while the other one is introduced into the liquid crystal light valve 25. Further, the optical path of the light beam having passed through the liquid crystal light valve 25 is then changed, and thereafter reflected by the above-mentioned truncated pyramidal mirror 11, and is then introduced into the projection lens 3. With this arrangement, in which the number of the light sources can be reduced by a half, it is possible to miniaturize the apparatus.

Seventh Embodiment

Figure 13:
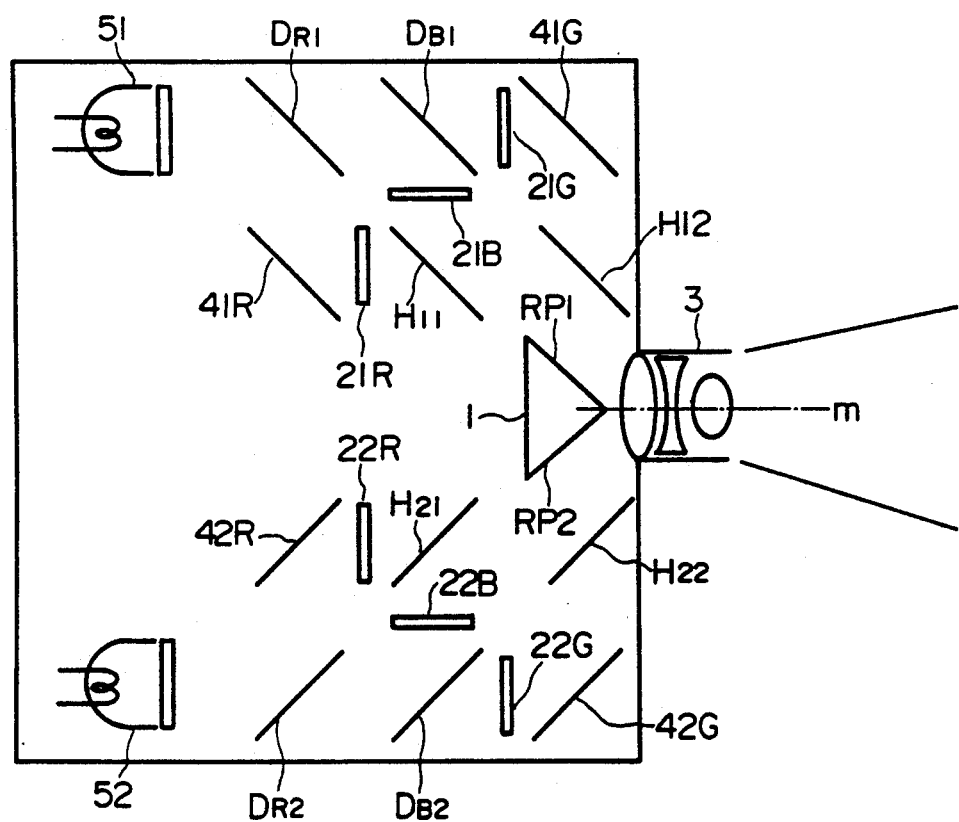
FIG. 13 is a sectional view illustrating the arrangement of a seventh embodiment of the present invention.
Figure 14:
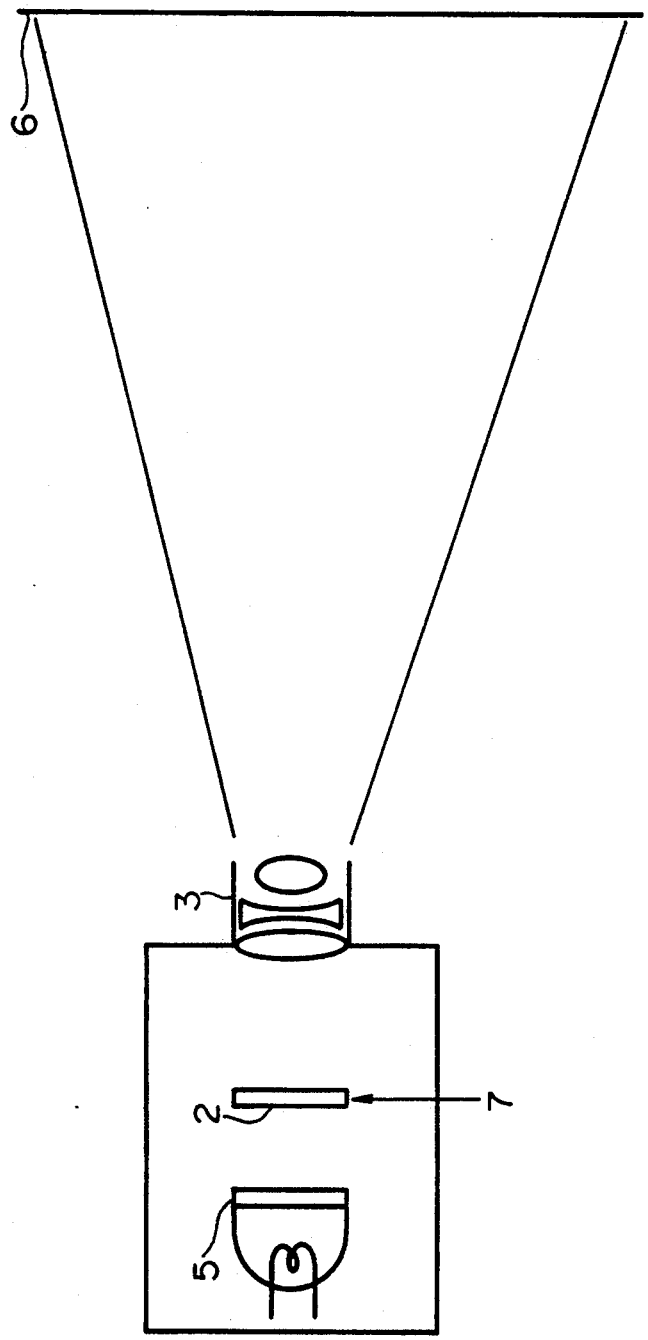
FIGS. 14 and 15 are sectional views illustrating the arrangement of a conventional example.
Figure 15:
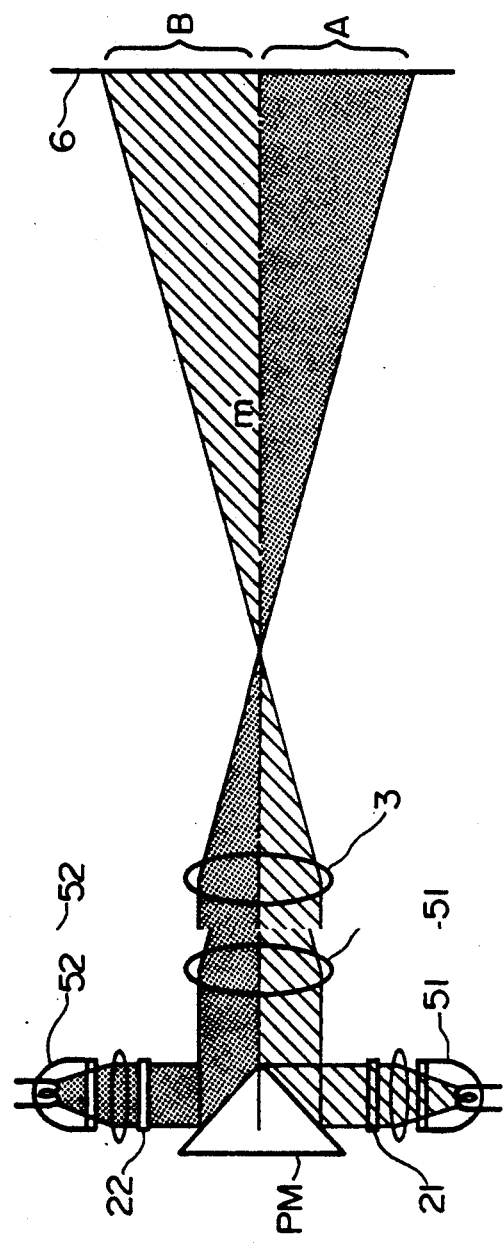

FIG. 13 is a sectional view illustrating the arrangement of a seventh embodiment of the present invention. In this figure, dichroic mirrors $D_{R1}$, $D_{R2}$ reflect only red color light but allow the other color light to pass through. Dichroic mirrors $D_{B1}$, $D_{B2}$ reflect only blue color light but allow the other color light to pass through. Monochromatic liquid crystal light valves $21_R$, $21_G$, $21_B$, $22_R$, $22_G$, $22_B$ have one and the same size and one and the same pixel number. Reference numerals $H_{11}$, $H_{12}$, $H_{21}$, $H_{22}$ denote half mirrors, respectively.

In the first to sixth embodiments which have been explained above, color liquid crystal light valves and monochromatic liquid crystal light valves are used respectively for projection and display of a color image and a monochromatic image. On the contrary, the feature of the seventh embodiment is the provision of an arrangement such that in particular a highly definitive color image is displayed. That is, in this embodiment, the original image is separated into three primary color components (red, green, blue). Then, for each of the primary color component images, similar to the above-mentioned embodiment, pixel lines which are laid horizontally on the original image are divided into two groups consisting of odd number lines and even number lines so as to separate an image given by the group consisting of odd number lines from an image given by the group consisting of even number lines. As a result, the original image is divided into six separate images. These six images are displayed in the monochromatic liquid crystal light valves $21_R$, $21_G$, $21_B$, $22_R$, $22_G$, $22_B$, respectively.

Next, explanation will be made of the color projection and display using such six monochromatic liquid crystal light valves. First, light emitted from the light source 51 is divided into red color light and the other color light by the dichroic mirror $D_{R1}$. The red color light reflected by the dichroic mirror $D_{R1}$ is reflected by the total reflection mirror $41_R$, and then passes through the liquid crystal light valve $21_R$. The light which has passed through the liquid crystal light valve 21R corresponds to image information which comprises the red color component covering the right half of the original image. Further, the light which has passed through the valve $21_R$ is reflected by the reflecting surface of the mirror 1 by way of the half mirror $H_{11}$, and the half mirror $H_{12}$, and then is incident upon the projection lens 3. Accordingly, a red color image is formed over the right half of the screen.

Next, of the light which has passed through the dichroic mirror $D_{R1}$, blue color light is reflected by the dichroic mirror $D_{B1}$. This blue color light passes through the liquid crystal light valve $21_B$ so as to be turned into a blue color component covering the right half of the original image. Further, the light which has passed through the valve $21_B$ is reflected by the reflecting surface PR1 of the mirror 1 by way of the half mirror $H_{11}$ and the half mirror $H_{12}$, and is incident upon the projecting lens 3. Accordingly, a blue color image is formed over the right half of the screen.

Meanwhile, the green light which has passed through the dichroic mirror $D_{B1}$ passes through the liquid crystal light valve $21_G$ so as to be turned into a blue color component covering the right half of the original image. Further, the light which has passed through the valve $21_G$ is reflected by the total reflection mirror $41_G$ and then passes through the half mirror $H_{12}$. Thereafter, the light incident upon the projecting lens 3 by way of the projecting surface PR1 of the mirror 11. Accordingly, a blue color image is formed over the right half of the screen.

Thus, the three primary color images are projected and displayed over the right half of the screen, that is, the right half of the original image is color-displayed. It is noted that the three liquid crystal light valves $21_{GR}$, $21_{GR}$, $21_{BR}$ are located at positions which are specially distant from each other. Attention should be taken to this arrangement. That is, in order to make equal to each other the sizes of the images projected on the screen, the lengths of the optical paths from the liquid crystal light valves $21_R$, $21_G$, $21_B$ to the projection lens 3 are set to be equal to each other.

From the above-mentioned explanation, the process in which the light emitted from the light source displays the color image over the right half of the screen is apparent. The process for the light emitted from the light source 52 is similar to the above-mentioned process, excepting that the color image covering the left half of the screen is shifted by a half of the value of pixel pitches Pw in the horizontal direction, with respect to the image covering the right half of the screen. With this arrangement, the six separate images are reproduced on the screen. Thus, with this projection and display, the image can be displayed with a resolution which is six times as high as that of the conventional projection and display.

Other Embodiments

In the above-mentioned embodiments, although the triangular mirrors or the pyramidal mirrors integrally incorporated with reflecting surfaces have been explained, the present invention is not limited to them, but an individual total reflection mirror can be used, instead of the reflecting surfaces.

In the above-mentioned embodiment, the pyramidal mirror having four reflecting surfaces is used. However, it is not limited to this, but a mirror having more than 4 reflecting surfaces may be used to enhance the pixel density.

Further, in the above-mentioned first embodiments, the projected images are horizontally shifted from each other by a half of the value of the pixel pitches Pw in order to enhance the horizontal resolution. However, the present invention is not limited thereto, but instead, may be shifted in the vertical direction so as to enhance the vertical resolution.

In the above-mentioned second embodiment, the concave mirrors are used to enhance the light convergent rate. However, instead of these mirrors, lenses may be used to enhance the light convergent rate.

Further, in the above-mentioned seventh embodiment, three primary color light can be obtained by two kinds of dichroic mirrors, but instead of the dichroic mirrors, dichroic prisms can be used to attain similar effects.

Further, in the above-mentioned embodiments, the liquid crystal light valve is used for each display means. However, according to the gist of the present invention, it is possible to obtain a highly fine projection and display, irrespective of the kind of display means. According to the present invention, although a high definition can be obtained with the use of liquid crystal light valves having a small numerical aperture, it goes without saying that a high definition also can be obtained with the use of liquid crystal light valves having a large numerical aperture.

In view of the foregoing, the gist of the present invention is to attain a projection and display with a high definition by use of an arrangement such that images which are formed by a plurality of liquid crystal light valves are reflected respectively by the associated mirrors, and thereafter, the images are led into one projection lens for projection and display. Thus, there may be used various kinds of configurations, which comes under the generic conception of the present invention, way be used.

What is claimed is;

1. A projector comprising:
a plurality of display means for displaying an image corresponding to an image signal;
a light source for emitting an incident light to said plurality of display means, said incident light passing through each display means thereby forming a plurality of light beams intensity-modulated in accordance with said image displayed on each said display means;
a projecting lens means for projecting along a single optical axis onto a screen and magnifying said light beams; and
a plurality of mirrors corresponding to said plurality of display means, each said mirror arranged to introduce said light beams to said projecting lens means, at lest one of said plurality of mirrors having a reflecting surface, said reflecting surface having an outer edge, said reflecting surface being arranged at a position wherein said reflecting surface does not cross said optical axis of said projecting lens means except at said outer edge;
whereby said light beams are superposed with each other on said screen over substantially the same area so as to reproduce a synthesized image.

2. A projector in accordance with claim 1, wherein an original image is divided into a plurality of image parts, and each said image signal corresponds to one of said plurality of image parts.

3. A projector in accordance with claim 1 further comprises a color separation means for separating said incident light into primary color components before said incident light passes through said plurality of display means.

4. A projector in accordance with claim 1, wherein each of said plurality of display means crosses an optical axis having branched out of one of said plurality of mirrors in its display surface.

5. A projector in accordance with claim 1, wherein each of said plurality of display means crosses an optical axis having branched out of one of said plurality of mirrors at a center of its display surface.

6. A projector comprising:
(a) first and second display means for displaying first and second images;
(b) a light source for emitting an incident light to said first and second display means, said incident light passing through said first and second display means thereby forming first and second light beams intensity-modulated in accordance with said first and second images;
(c) a projecting lens means for magnifying and projecting along a single optical axis onto a screen said first and second light beams; and
(d) first and second mirrors for reflecting said first and second light beams, said first and second mirrors arranged to introduce said first and second light beams to said projecting lens means, at least one of said first and second mirrors having a reflecting surface, said reflecting surface having an outer edge, said reflecting surface being arranged at a position wherein said reflecting surface does not cross said optical axis of said projecting lens means except at said outer edge;
whereby said first and second light beams are superposed with each other on said screen over substantially the same area so as to reproduce a synthesized image.

7. A projector in accordance with claim 6, wherein said first and second mirrors are located at angular positions where an angle between reflecting surfaces thereof is bisected by said optical axis of said projecting lens means.

8. A projector in accordance with claim 6, wherein aid first and second display means are arranged so that axes orthogonal to said optical axis of said projecting lens means are set at their display centers.

9. A projector in accordance with claim 6, wherein said first and second images correspond to a first and second part of an original image.

10. A projector in accordance with claim 6, characterized in that pixel lines which are laid horizontally on an original image are divided into two groups consisting of odd number lines and even number lines, pixels in said group consisting of odd number lines being allocated to either one of said first and second display means, and pixels in said group consisting of even number lines are allocated to the other one thereof, said synthesized image being a projection of said original image.

11. A projector in accordance with claim 6, characterized in that pixel lines which are laid vertically on an original image are divided into two groups consisting of odd number lines and even number lines, pixels in said group consisting of even number lines are allocated to either one of said first and second display means, and pixels in said group consisting of even number lines are allocated to the other one thereof, said synthesized image being a projection of said original image.

12. A projector in accordance with claim 6, wherein said first and second mirrors introduce said first and second light beams to said projecting lens means while shifting said second light beam by Pw/2, relative to said first light beam, where Pw is a value of pixel pitches which indicates intervals of pixels arrayed in said first and second display means.

13. A projector comprising:
(a) first and second display means for displaying first and second images;
(b) a light source for emitting an incident light to said first and second display means, said incident light passing through said first and second display means thereby forming first and second light beams intensity-modulated in accordance with said first and second images;
(c) a projecting lens means for magnifying and projecting onto a screen said first and second light beams; and
(d) first and second mirrors for reflecting said first and second light beams, said first and second mirrors arranged to introduce said first and second light beams to said projecting lens means;
(e) first and second concave mirrors disposed between said light source and said first and second display means, optical axes of said first and second concave mirrors aligned respectively with centers of said first and second display means so as to converge light emitted from said light source and to introduce the same into said first and second display means.

14. A projector
in accordance with claim 6, further comprising first and second convex lenses disposed between said light source and said first and second display means, optical axes of said first and second convex lenses aligned respectively with centers of said first and second display means so as to converge light from said light source and to introduce the same into said first and second display means.

15. A projector comprising:
(a) first and second display means for displaying first and second images;
(b) a light source for emitting an incident light to said first and second display means, said incident light passing through said first and second display means thereby forming first and second light beams intensity-modulated in accordance with said first and second images;
(c) a projecting lens means for magnifying and projecting onto a screen said first and second light beams; and
(d) first and second mirrors for reflecting said first and second light beams, said first and second mirrors arranged to introduce said first and second light beams to said projecting lens means;
wherein said light source is located obliquely with respect to the rear of one of said first and second display means.

16. A projector comprising:
(a) first to fourth display means for forming first to fourth images;
(b) a light source for emitting an incident light to said first to fourth display means, said incident light passing through said first to fourth display means thereby forming first to fourth light beams intensity-modulated in accordance with said first to fourth images;
(c) a projecting lens means for magnifying and projecting along a single optical axis onto a screen said first to fourth light beams; and
(d) first to fourth mirrors for reflecting said first to foruth light beams, said first to fourth mirrors arranged to introduce said first to fourth light beams to said projecting lens means, at least one of said first to fourth mirrors having a reflecting surface arranged at a position wherein said reflecting surface does not cross said optical axis of said projecting lens.

17. A projector comprising:
(a) first to fourth display means for forming first to fourth images;
(b) a light source for emitting an incident light to said first to fourth display means, said incident light passing through said first to fourth display means thereby forming first to fourth light beams intensity-modulated in accordance with said first to fourth images;
(c) a projecting lens means for magnifying and projecting onto a screen said first to fourth light beams; and
(d) first to fourth mirrors for reflecting said first to fourth light beams, said first to fourth mirrors arranged to introduce said fist to fourth light beams to said projecting lens means;
wherein said first to fourth mirrors are integrally incorporated with each other as inclined surfaces of a rectangular pyramid, and an apex of said rectangular pyramid is set on an optical axis of said projecting lens means.

18. A projector comprising:
(a) first to fourth display means for forming first to fourth images;
(b) a light source for emitting an incident light to said first to fourth display means, said incident light passing through said first to fourth display means thereby forming first to fourth light beams intensity-modulated in accordance with said first to fourth images;

(c) a projecting lens means for magnifying and projecting onto a screen said first to fourth light beams; and (d) first to fourth mirrors for reflecting said first to fourth light beams, said first to fourth mirrors arranged to introduce said first to fourth light beams to said projecting lens means;

wherein said first to fourth mirrors are triangular mirrors having three sides;

said first to fourth display means are arranged in first to fourth planes respectively which are parallel to an optical axis of said projecting lens means, said first to fourth planes also being parallel to one of said three sides of said first to fourth mirrors respectively;

centers of display surfaces of said first to fourth display means being aligned with a vertex of first to fourth isosceles triangles which are obtained by projecting reflecting surfaces of said first to fourth mirrors onto said first to fourth planes respectively;

sides of said first to fourth display means being arranged to be either in parallel with or orthogonal to one side of said first to fourth isosceles triangles respectively.

19. A projector in accordance with claim 16, wherein said first to fourth light beams are projected while being shifted from each other by Pw/n (n is an integer), where Pw is a value of pixel pitches, so as to form an original image.

20. A projector comprising:

(a) first to fourth display means for forming first to fourth images;

(b) a light source for emitting an incident light to said first to fourth display means, said incident light passing through said first to fourth display means thereby forming first to fourth light beams intensity-modulated in accordance with said first to fourth images;

(c) a projecting lens means for magnifying and projecting onto a screen said first to fourth light beams; and (d) first to fourth mirrors for reflecting said first to fourth light beams, said first to fourth mirrors arranged to introduce said first to fourth light beams to said projecting lens means;

(e) fifth to eighth mirrors disposed between said first to fourth mirrors and said projecting lens means; and (f) fifth to eight display means corresponding to said fifth to eighth mirrors.

* * * * *

UNITED STATES PATENT AND TRADEMARK OFFICE
CERTIFICATE OF CORRECTION

PATENT NO. : 5,300,966
DATED : April 05, 1994
INVENTOR(S) : Kazutake UEHIRA et al It is certified that error appears in the above-indentified patent and that said Letters Patent is hereby corrected as shown below:

On the title page item, [57] in the abstract line 16,

After "which" insert --is--.

Claim 3, Column 12, Line 30: "comprises" should read --comprising--.

Claim 8, Column 13, Line 7: "aid" should read --said--.

Claim 11, Column 13, Line 27: "even" should read --odd--.

Claim 20, Column 16, Line 27: "eight" should read --eighth--.

Signed and Sealed this

Tenth Day of January, 1995

*Attest:*

BRUCE LEHMAN

*Attesting Officer*    Commissioner of Patents and Trademarks